United States Patent [19]
Adams, Jr.

[11] Patent Number: 5,480,196
[45] Date of Patent: Jan. 2, 1996

[54] DUCTILE IRON PIPE JOINT EMPLOYING A COUPLING AND COUPLING THEREFOR

[75] Inventor: William T. Adams, Jr., Hoover, Ala.

[73] Assignee: American Cast Iron Pipe Company, Birmingham, Ala.

[21] Appl. No.: 288,725

[22] Filed: Aug. 15, 1994

[51] Int. Cl.⁶ .................................................. F16L 71/00
[52] U.S. Cl. ........................ 285/369; 285/370; 285/351; 285/464; 285/55; 285/347
[58] Field of Search ................................. 285/369, 370, 285/351, 331, 404, 417, 55, 345, 347

[56] References Cited

U.S. PATENT DOCUMENTS

| | | | |
|---|---|---|---|
| 2,829,909 | 4/1958 | Magnani | 285/95 |
| 2,900,199 | 8/1959 | Logan | 285/370 |
| 3,066,961 | 12/1962 | Gerin | 285/369 |
| 3,224,798 | 12/1965 | Hausmann | 285/288 |
| 3,582,113 | 6/1971 | Cauthery | 285/110 |
| 3,781,040 | 12/1973 | Lasko et al. | 285/404 |
| 3,993,334 | 11/1976 | Fridman et al. | 285/344 |
| 4,400,019 | 8/1983 | Fruck | 285/369 |
| 4,550,936 | 11/1985 | Haeber et al. | 285/370 |
| 5,092,633 | 3/1992 | Burkit | 285/370 |
| 5,174,615 | 12/1992 | Foster et al. | 285/370 |
| 5,205,671 | 4/1993 | Handford | 405/154 |
| 5,330,238 | 7/1994 | Carlstrom | 285/369 |

FOREIGN PATENT DOCUMENTS

| | | | |
|---|---|---|---|
| 2057605 | 6/1993 | Canada | 285/370 |
| 1292738 | 3/1962 | France | 285/370 |
| 1534902 | 8/1968 | France | 285/370 |
| 3026681 | 2/1982 | Germany | 285/370 |
| 136459 | 3/1930 | Switzerland | 285/370 |
| 848476 | 9/1960 | United Kingdom | 285/370 |

Primary Examiner—Eric K. Nicholson
Attorney, Agent, or Firm—Kerkam, Stowell, Kondracki & Clarke

[57] ABSTRACT

A pipe joint capable of transmitting high axial compressive loads includes a reduced wall thickness section at the ends of the pipe to be joined and a coupling sleeve supported in telescoping relation with the reduced wall thickness section. Shoulders formed at the ends of the reduced sections bear against the ends of the sleeve, and the ends of the reduced thickness sections bear against each other so that a portion of the axial compressive load is transmitted through the coupling sleeve and a portion through the reduced thickness sections and a substantially uniform unit stress is maintained. O-rings carried by the coupling sleeve provide a fluid-tight seal between the sleeve and the adjacent surface of the reduced thickness section of the pipe.

22 Claims, 1 Drawing Sheet

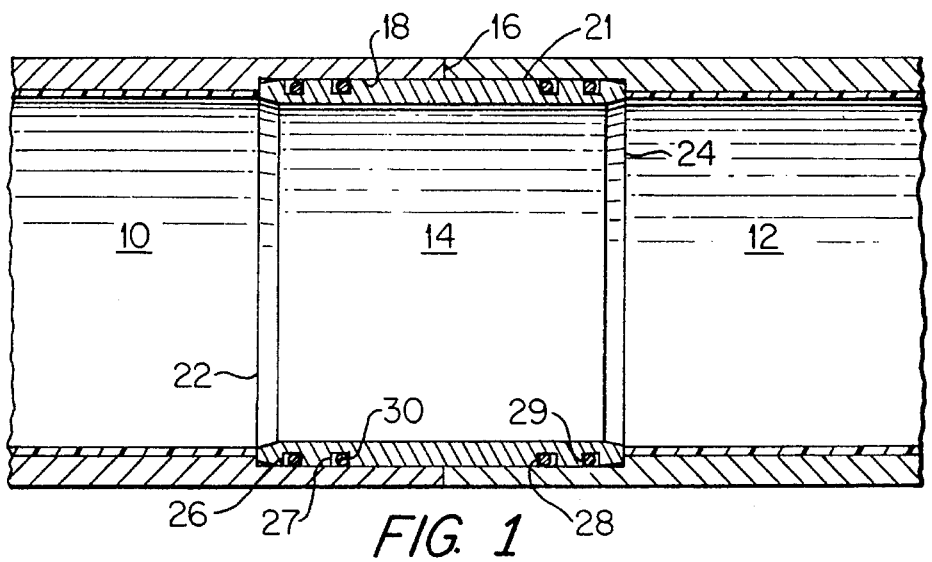
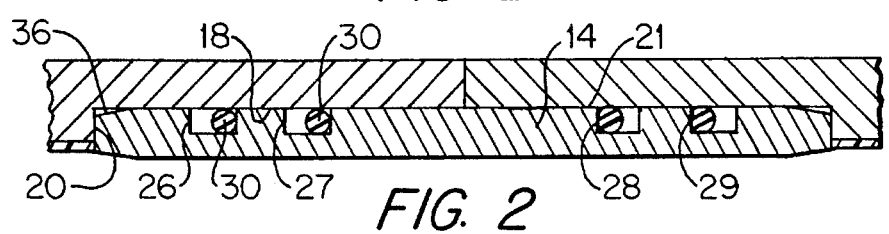
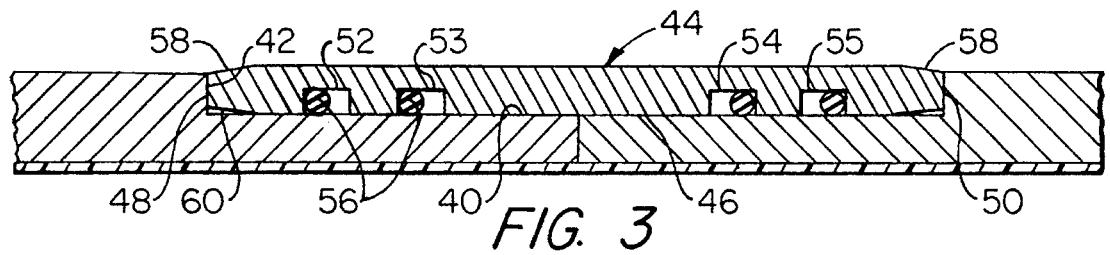
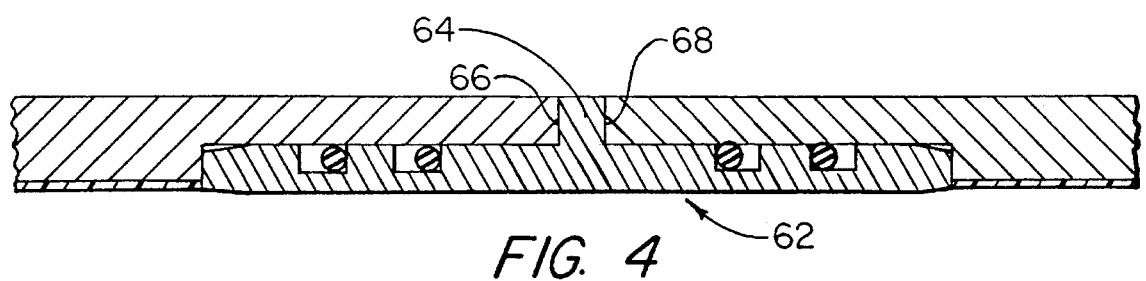
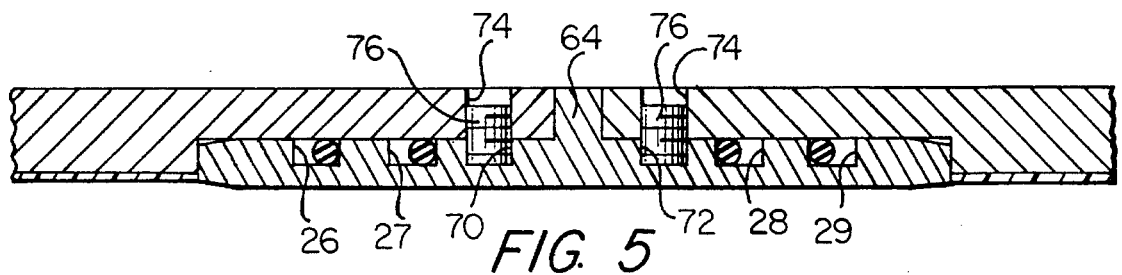

5,480,196

DUCTILE IRON PIPE JOINT EMPLOYING A COUPLING AND COUPLING THEREFOR

BACKGROUND OF THE INVENTION

1. Field of the Invention

This invention relates to ductile iron pipe joints, and more particularly to such a pipe joint employing a coupling element forming a fluid tight high strength coupling suitable for use in trenchless pipe installations.

2. Description of the Prior Art

It is frequently necessary or desirable to install underground pipe without digging an open trench for placing the pipe. For example, in installing new water or sewer systems or replacing old pipe in an urban area, it is often necessary to place a pipe beneath an existing road, street or railroad where it is not practical to interrupt traffic for a time sufficient to cut an open trench across the roadway, install the pipe, backfill the trench, and replace the roadway. In such cases, it is known to install the pipe in such a trenchless operation by pushing the pipe through the soil beneath the roadway, and one system for installing pipe in a trenchless operation is disclosed, for example, in U.S. Pat. No. 5,205,671 to Handford.

Although conventional bell and spigot joints of the type employed in ductile iron pipe are capable of withstanding substantial axial compressive loads, such joints are not designed to carry loads of the magnitude frequently required to push pipe into place in a trenchless operation. Further, the increased diameter of the bell results in a substantial increase in the load required to push the pipe through the soil and results in a substantial, concentrated radial compressive load on the pipe at the joint. It is, therefore, an object of the present invention to provide a high strength, leak-proof coupling for ductile iron pipe for use in a trenchless pipe installation.

Another object is to provide such a pipe joint having a substantially smooth outside diameter substantially equal to the outside diameter of the pipe joined.

Another object is to provide such a pipe joint employing a high strength coupling element which does not materially interfere with the flow of fluids through the pipe.

Another object is to provide such a high strength pipe joint employing a coupling element capable of transmitting substantial axial compressive loads between two lengths of pipe joined by the coupling.

Another object is to provide such a pipe joint coupling including a coupling which may be interlocked with the pipe to provide a restrained joint.

SUMMARY OF THE INVENTION

In the attainment of the foregoing and other objects and advantages, an important feature of the invention resides in providing a high strength coupling spool dimensioned to span and cooperate with the abutting ends of a pair of pipes to be joined. Each pipe end is machined, either on its outer or inner diameter, to provide a reduction in wall thickness for the pipe at the open end. The reduced wall thickness on the open end portions of the two pipes, when the pipes are in abutting relation, provides an annular groove dimensioned to receive the outer or inner diameter of the coupling spool, depending upon whether the pipe is machined on the outside or counterbored on the inner diameter. The ends of the pipes to be joined are machined to provide a flat end surface perpendicular to the axis of the pipe, and the depth of the internal counterbore or length of the external annular groove is such that the length of the resulting groove provided when the two pipes are joined corresponds with the overall length of the spool. Thus, when the three elements are telescoped together, the ends of the spool abut and rest upon the shoulders at the ends of the groove and the ends of the pipe abut one another.

A plurality of O-ring grooves are formed in the coupling spool for receiving O-rings which cooperate with the groove in the pipe ends to form a fluid-tight seal. A restraining groove may be formed inboard of the O-ring groove or grooves at each end of the spool, and a rigid locking pin or key may be inserted through an opening in the end portion of each pipe and extend into the restraining groove to prevent separation of the joint.

The radial thickness of the coupling spool is such as to not materially alter the wall thickness of the assembly at the joint. Thus, when the coupling spool is mounted on the outside of the pipes joined, the outside diameter of the spool is not substantially greater than the outside diameter of the pipe or, when the spool is mounted inside the pipes, the inside diameter is not substantially less than the inside diameter of the pipes joined.

By accurately machining the end of the pipes to provide a groove to correspond to the length of the spool, substantially all of the projected end face area of each pipe will share the compressive load, thereby minimizing unit compressive stresses in this area and assuring maximum column strength for the joined pipe.

DESCRIPTION OF THE PREFERRED EMBODIMENTS

The foregoing and other features and advantages of the invention will be apparent from the detailed description contained hereinbelow, taken in conjunction with the drawings, in which:

FIG. 1 is a longitudinal cross sectional view of a pipe joint according to one embodiment of the present invention;

FIG. 2 is an enlarged exploded view of a portion of the structure shown in FIG. 1;

FIG. 3 is a view similar to FIG. 2 showing an alternate embodiment of the invention;

FIG. 4 is a view similar to FIG. 2 showing a further embodiment of the invention; and FIG. 5 is a fragmentary isometric view showing the restraining feature of the pipe joint according to the present invention.

DESCRIPTION OF THE PREFERRED EMBODIMENTS

Referring now to the drawings in detail, a pair of ductile iron pipes 10, 12 are shown joined in end-to-end relation in FIG. 1 by a coupling spool or sleeve member designated generally at 14. Pipes 10 and 12 are identical and accordingly like reference numerals will be employed to designate corresponding portions of the pipes in the drawings.

As most clearly seen in FIG. 2, pipes 10 and 12 have their end faces 16 machined or otherwise shaped to provide flat smooth surfaces disposed in a plane perpendicular to the longitudinal axis of the pipes. Each pipe is also provided with a counterbore providing an enlarged cylindrical inner surface 18 extending inwardly from end face 16 and terminating in a radial shoulder 20 in spaced relation to end face 16. The diameter of the counterbored surface 18 is such that shoulder 20 has a radial dimension which preferably is no more than about ½ the original wall thickness of the pipe 10, 12.

The outer cylindrical surface 21 of coupling sleeve 14 has a diameter substantially equal to the diameter of the counterbores 18 and is substantially complementary to the cylindrical surface of the counterbore when received therein in telescoping relation, and the overall length of coupling 14 is equal to twice the depth of the counterbores 18. Coupling 14 is preferably formed from a high strength, corrosion resistant material, preferably steel, and has an inside diameter substantially equal to or only slightly smaller than the inside diameter of the pipes 10, 12 so that the wall thickness of the coupling sleeve is substantially equal to or only slightly greater than the radial dimension of shoulder 20.

The end faces 22, 24 of sleeve 14 are planar surfaces disposed perpendicular to the longitudinal axis of the sleeve so that, when installed in the pipe as illustrated in FIG. 1, the end faces 22, 24 abut and bear against the radial shoulder 20 on pipes 10, 12, respectively. At the same time, the end faces 16 on pipes 10, 12, respectively, bear against one another. When an axial compressive load is applied between the pipes 10, 12 thus connected, the load is carried partially by the abutting counterbored ends of the respective pipes and by the coupling sleeve 14 bearing against shoulders 20. Thus, substantially the entire projected area of the cross section of the pipe will be subjected to a substantially uniform compressive load, thereby substantially eliminating concentrated compressive stresses at the joint.

In order to provide a fluid-tight seal between pipes 10, 12, across the joint, coupling sleeve 14 is provided with four axially spaced O-ring grooves 26, 27, 28, 29 extending around its outer periphery, two adjacent each end thereof, for receiving a like member of identical O-rings 30, one in each groove.

In order to facilitate insertion of the coupling sleeve 14 into the open end of each counterbore, preferably the outer surface 21 of coupling 14 is slightly tapered, or chamfered, as shown at 36 adjacent each end. This chamfer may, for example, be at an angle of about 5° and extend up to about ½ inch from the end of the sleeve in a coupling spool having an overall length of about 6 inches such as might be suitable for forming a joint in ductile iron pipe having a diameter of 16 inches or greater. It is apparent that this chamfer, when employed, will reduce slightly the area of end surfaces 22, 24 bearing on the shoulders 20, but this reduction is so slight as to not materially affect the load transmitted between the shoulder and the abutting end of the sleeve.

In order to assure against failure of the sleeve in the area of the O-ring grooves 26, 28, under compressive load, the internal diameter of the sleeve 14 may be slightly less than the internal diameter of the pipe 10, 12. By forming the sleeve from a high strength steel material, however, such increased thickness may not be necessary and in any event, the internal diameter of the sleeve 14 in the pipes 12 are maintained as nearly the same as possible. When the internal diameter of sleeve 14 is slightly less than the internal diameter of the pipe, the internal surface of the sleeve may also be chamfered as at 36 to provide a smooth transition between the two diameters to thereby minimize the effect on flow characteristics of fluid through the pipe.

Referring now to FIG. 3, an alternate embodiment of the invention is disclosed wherein the ductile iron pipes 10, 12 are milled, or machined, on their outer surface to produce a reduced diameter ring having a cylindrical outer surface 40, corresponding generally to counterbore surface 18, and terminate in shoulders 42 corresponding generally to shoulders 20. In this embodiment, the coupling sleeve 44 has an internal cylindrical surface 46 dimensioned to fit over and closely receive the external surface portion 40, with its ends 48, 50 bearing against the shoulders 42 on pipes 10, 12, respectively, when the end surfaces of the pipe are in contact with one another. O-ring grooves 52, 53, 54, 55 are formed in the inner peripheral surface of the sleeve 44 and O-rings 56 are positioned one in each groove to engage the outer surface 40 to form a fluid-tight seal.

The outside diameter of sleeve 44 is preferably substantially equal to or only slightly greater than the outside diameter of the pipes 10, 12, and when the outside diameter of the sleeve is greater than that of the pipe, the outer surface portion is preferably chamfered at each end, as shown at 58, to provide a smooth, even transition between the outer surface of the pipe and the outer surface of the coupling sleeve. This reduced the resistance encountered by the joint being pushed through soil in a trenchless installation. Also, the inner periphery of the sleeve may be chamfered, adjacent its ends, as shown at 60, to facilitate telescoping the sleeve over the end of the pipe.

Referring now to FIG. 4, a further modification of the pipe joint shown. In this embodiment, the open ends of the pipes 10, 12 are prepared in the same manner as in the embodiment shown in FIGS. 1 and 2, and the coupling sleeve 62 is substantially identical to the sleeve 14 described above, with the exception that the sleeve has a greater overall length than the sum of the lengths of the counterbores 18 in the two pipes and has an integral, outwardly directed flange 64 formed on and extending around its outer periphery as its midsection. Flange 64 has radially extending side faces 66, 68, for abutting the end faces 16 on the respective pipes 10, 12.

Referring now to FIG. 5, a further embodiment of the invention is illustrated in which a pair of coupling restraining grooves 70, 72 are formed around the outer periphery of coupling sleeve 14. A plurality of radially extending openings 74 are drilled and tapped through the counterbored portion 18 of each pipe 10, 12 at a location in radial alignment with the restraining grooves 70, 72 when the joint is assembled. Threaded plugs, or fasteners, 76 may be threaded into the openings 74 a distance to project into the grooves 70, 72 to restrain the joint against separation.

It is also contemplated that, where the sidewalls of the pipes 10, 12, are sufficiently thick, the radial drilled and tapped holes 74 may be replaced with drilled holes extending through the counterbored portion of the pipes in a direction tangent to the surface of the restraining grooves. In this case elongated interlocking pins or rods may be inserted into the holes to engage the sidewalls of the restraining grooves to provide a greater bearing surface for interlocking the joined elements.

It is also contemplated that relatively thin ring-shaped washers formed from a softer metallic material such as copper, might be employed between the opposed end faces 16 of the pipe, and between the end faces of the coupling sleeve and the cooperating shoulder, with the washers, or shims, being capable of being deformed slightly to accommodate minor surface irregularities or imperfections to thereby provide a more uniform load distribution and transfer between the connected pipes under axial compressive load.

A pipe joint as described with reference to FIGS. 1 and 2 was prepared using two lengths of 16 inch round, Class 55 ductile iron pipe. The ends of the pipe were counterbored to an inside diameter of 16.80 inches for a depth of 3 inches. The coupling sleeve was formed from stainless steel having an internal diameter of 16.00 inches and an external diameter of 16.77 inches, with an overall length of 6 inches. The joint was assembled using O-ring seals as described above, and was pressure tested. The hydrostatic testing was conducted by initially pressurizing the assembly to 750 psi and holding at this pressure for 5 minutes. Pressure was then increased to 800 psi and then dropped to 350 psi. No leaks were detected. The pressure was then reduced in steps to 0 and the assembly was again inspected, but no leaks were observed.

A joint of the type just described was also subjected to an end load test by applying end thrusts to the joint in a test press. An axial compressive or column load was applied up to 314 tons and the joint was inspected without any signs of failure being evident. The load was then gradually increased to 502 tons at which point compression failure resulted as evidenced by buckling in the counterbored area.

While preferred embodiments of the invention have been disclosed and described, it is believed apparent that the invention is not so limited and it is intended to include all embodiments thereof which would be apparent to one skilled in the art and which come within the spirit and scope of the invention.

What is claimed is:

1. A method of forming a high axial compression strength joint between two ductile iron pipes of equal diameter for trenchless installation, comprising providing a substantially planar end face on one end of each of the two pipes to be joined, the planar end faces being perpendicular to the longitudinal axis of the respective pipes, providing a section of reduced substantially uniform wall thickness on the end of each said pipe, said sections each extending a predetermined distance from said planar end face and having a cylindrical surface terminating in a substantially radial shoulder, providing a high strength axial compressive load carrying coupling sleeve having a cylindrical wall in telescoping relation with and substantially complementary to said cylindrical surfaces on said pipes to be joined, said coupling sleeve having planar end faces which are perpendicular to said cylindrical wall, providing a plurality of O-ring grooves formed in said cylindrical wall, and providing an O-ring supported in each said O-ring groove, said O-rings forming a fluid-tight seal between said coupling sleeve and each said cylindrical surface, the length of said coupling sleeve being equal to the sum of the lengths of said sections of reduced wall thickness whereby, when said cylindrical wall and said cylindrical surfaces are in said telescoping relation, the end faces of said pipe are in abutting relation and the end faces of said coupling sleeve are in abutting relation one with each said radial shoulder whereby all axial compressive loads applied between the two pipes are transmitted therebetween partially through said coupling sleeve and partially through said reduced wall thickness sections of each said pipe.

2. The method defined in claim 1 wherein the step of providing a reduced wall thickness section on each said pipe comprises forming a counterbore in the end thereof, said counterbore terminating in a radial wall providing said radial shoulder.

3. The method defined in claim 2 wherein the wall thickness of the pipe in said sections of reduced wall thickness is about ½ the original wall thickness of the pipe.

4. The method defined in claim 2 comprising providing at least two O-rings forming a fluid-tight seal between said coupling sleeve and each said cylindrical surface.

5. The method defined in claim 4 wherein said coupling sleeve is formed from a high strength corrosion resistant steel.

6. The method defined in claim 5 wherein the wall thickness of the pipe in said sections of reduced wall thickness is about ½ the original wall thickness of the pipe.

7. The method defined in claim 1 wherein the step of providing a reduced wall thickness section comprises machining or grinding the external surface of said one end of each said pipe to reduce the outside diameter thereof for said predetermined distance.

8. The method defined in claim 7 wherein the wall thickness of the pipe in said sections of reduced wall thickness is about ½ the original wall thickness of the pipe.

9. The method defined in claim 7 comprising providing at least two O-rings forming a fluid-tight seal between said coupling sleeve and each said cylindrical surface.

10. A pipe joint coupling for transmitting high axial compressive loads between two ductile iron pipes of equal diameter for a trenchless installation, the joint comprising, a substantially planar end face on one end of each pipe to be joined, the planar end faces being perpendicular to the longitudinal axis of the respective pipes, a section of reduced, substantially uniform wall thickness on said one end of each said pipe, said reduced wall thickness section providing a cylindrical surface extending a predetermined distance from said planar end face and terminating in a radial shoulder, a high strength compressive load carrying coupling sleeve having a cylindrical wall portion in telescoping relation with and substantially complementary to each said cylindrical surface, said sleeve having a plane end face at each end perpendicular to said cylindrical wall portion, a plurality of O-ring grooves formed in said cylindrical wall portion and an O-ring supported in each said O-ring groove with at least one O-ring contacting and forming a fluid-tight seal between the cylindrical wall portion and each said cylindrical surface, said coupling sleeve having its planar end faces in abutting relationship one with each said radial shoulder and said planar end faces on said one end of each said pipe being in abutting relationship whereby all axial compressive loads applied between said two pipes are transmitted partially through said coupling sleeve and partially through said reduced wall thickness sections.

11. The pipe joint defined in claim 10 wherein said cylindrical surfaces comprise the cylindrical surface of a counterbore formed into said one end of said pipes.

12. The pipe coupling defined in claim 11 wherein said counterbore reduces the wall thickness of each said pipe by about ½.

13. The pipe joint defined in claim 12 further comprising a pair of stabilizing grooves formed in said cylindrical wall, at least one opening extending through the section of reduced wall thickness of each pipe, and locking means extending through said at least one opening in each said section of reduced wall thickness and projecting into one of said pair of stabilizing grooves to prevent separation of the joint during handling.

14. The pipe coupling defined in claim 11 wherein each said cylindrical surface is an external surface and wherein the wall thickness of each said reduced wall thickness section is about ½ the wall thickness of the pipe at a location spaced from said reduced wall thickness section.

15. A method of forming a high axial compression strength joint between two ductile iron pipes of equal diameter for trenchless installation, comprising providing a substantially planar end face on one end of each of the two pipes to be joined, the planar end faces being perpendicular to the longitudinal axis of the respective pipes, providing a section of reduced substantially uniform wall thickness on the end of each said pipe, said reduced wall thickness sections each extending a predetermined distance from said planar end face and having a cylindrical surface terminating in a substantially radial shoulder, providing a single load bearing coupling member in the form of a high strength coupling sleeve between said one end of said pipes, said coupling sleeve having a pair of axially spaced cylindrical wall portions adapted to be received one in telescoping relation with and substantially complementary to said cylindrical surface on each of said pipes to be joined, said coupling sleeve having planar end faces which are perpendicular to said cylindrical wall surfaces, providing an annular radially extending ring around said coupling sleeve at a location equally spaced from each end thereof, said annular ring having parallel end faces perpendicular to said cylindrical wall portion, providing at least one O-ring groove in each said cylindrical wall portion, providing an O-ring supported in each said O-ring groove, said O-rings forming a fluid-tight seal between said coupling sleeve and each said cylindrical surface, and mounting said coupling sleeve on said pipes to be joined with said cylindrical wall portions in telescoping relation one with each said cylindrical surface with the end faces of said coupling sleeve in abutting relationship with said shoulders and the end face of said pipes in abutting relationship one with each said end face on said annular ring whereby all axial compressive load applied between the two pipes will be transmitted partially through said coupling sleeve to said shoulders and partially through said annular ring and said reduced wall thickness sections of each said pipe.

16. The method defined in claim 15 wherein said annular ring is a flange integrally formed on said coupling sleeve and projecting radially from said cylindrical wall portions.

17. The method defined in claim 16 wherein the step of providing a reduced wall thickness section on each said pipe comprises forming a counterbore in the end thereof, said counterbore terminating in a radial wall providing said radial shoulder.

18. A pipe joint coupling for transmitting high axial compressive loads between two ductile iron pipes of equal diameter for trenchless installation, the joint comprising, a substantially planar end face on one end of each pipe to be joined, the planar end faces being perpendicular to the longitudinal axis of the respective pipes, a section of reduced substantially uniform wall thickness on said one end of each said pipe, said reduced wall thickness section providing a cylindrical surface extending a predetermined distance from said planar end face and terminating in a radial shoulder, a high strength coupling sleeve having a cylindrical wall in telescoping relation with and substantially complementary to each said cylindrical surface, said sleeve having end faces perpendicular to said cylindrical wall, an annular flange on said coupling sleeve projecting radially from said cylindrical wall at a location equally spaced from the end faces thereof, at least one O-ring groove formed in said cylindrical wall between said annular flange and each said planar end of said coupling sleeve, and an O-ring supported in each said O-ring groove with at least one O-ring contacting and forming a fluid-tight seal between the cylindrical wall and each said cylindrical surface, said coupling sleeve having its planar end faces in abutting relationship one with each said radial shoulder and said planar end faces on said one end of each said pipe being in abutting relationship with said annular flange whereby all compressive loads applied between the two pipes are transmitted therebetween partially through said coupling sleeve and partially through said reduced wall thickness sections of each said pipe.

19. The pipe joint defined in claim 11 wherein said cylindrical surfaces comprise the cylindrical surface of a counterbore formed into said one end of said pipes.

20. The pipe coupling defined in claim 19 wherein said counterbore reduces the wall thickness of each said pipe by about ½.

21. The pipe coupling defined in claim 18 wherein each said cylindrical surface is an external surface and wherein the wall thickness of each said reduced wall thickness section is about ½ the wall thickness of the pipe at a location spaced from said reduced wall thickness section.

22. The method defined in claim 16 wherein the step of providing a reduced wall thickness section comprises machining or grinding the external surface of said one end of each said pipe to reduce the outside diameter thereof for said predetermined distance.

* * * * *